Dec. 19 1922.
A. F. ERICKSON.
VALVE OPERATING DEVICE.
FILED SEPT. 15. 1920.
1,439,231
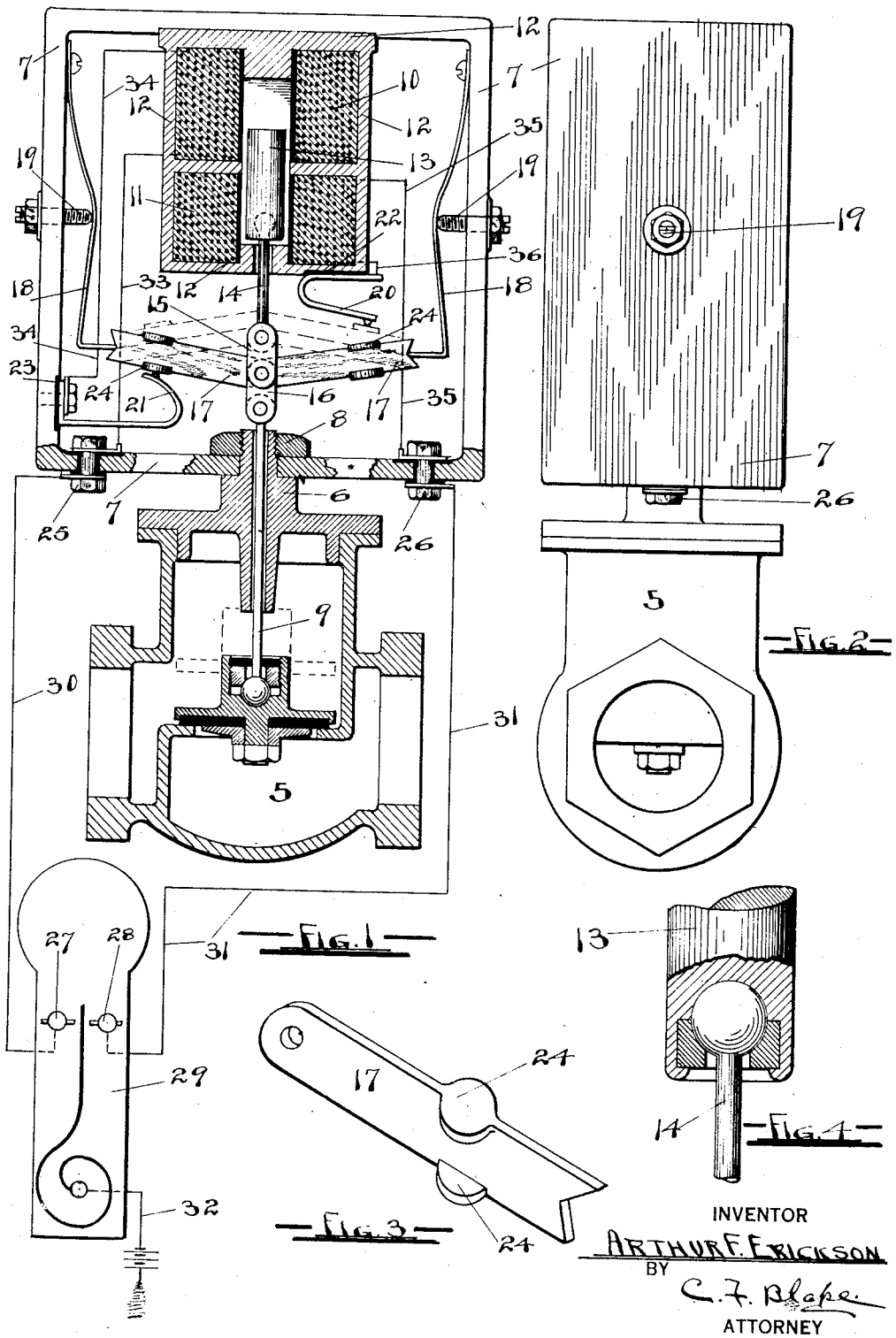
INVENTOR
ARTHUR F. ERICKSON
BY
C. F. Blake
ATTORNEY Patented Dec. 19, 1922.

1,439,231

UNITED STATES PATENT OFFICE.

ARTHUR F. ERICKSON, OF PORTLAND, OREGON.

VALVE-OPERATING DEVICE.

Application filed September 15, 1920. Serial No. 410,522.

*To all whom it may concern:*

Be it known that I, ARTHUR F. ERICKSON, a citizen of the United States, residing at Portland, county of Multnomah, State of Oregon, have invented certain new and useful Improvements in Valve-Operating Devices, of which the following is a specification.

My invention relates to devices for opening and closing valves in general, and particularly to such devices as are adapted for use with the valves upon gas mains or pipes in connection with gas heating furnaces and the like.

The object of my invention is to provide an electrically operated device that will open and close such a valve with that quick movement that is commercially known as "snap action", and that will hold said valve open or closed positively until further operation of the device: a further object of my invention is to eliminate all electric motors and other mechanical members of the system usually used for operating such valves, and to provide in one device means for opening and closing the valve with a snap action, and means for operating said opening and closing means in direct connection with and controlled by a thermostat.

I accomplish the above object by means of the construction illustrated in the accompanying drawing, which is a part of this application for Letters Patent, like characters of reference indicating like parts throughout the several views thereof, and in which:

Fig. 1 is a sectional elevation of a valve and my device mounted together, and wired to a thermostat.

Fig. 2 is a side elevation of the same.

Fig. 3 is a perspective view of one of the toggle arms.

Fig. 4 is a detail fragmentary view of the plunger and valve rod, showing one method of connecting the same.

In general my device consists of a pair of solenoids mounted adjacently and coaxially and having a common plunger, a valve stem connected to said plunger and extending into the valve to be operated, and means upon the valve stem for insuring positive opening and closing of the valve and also a snap action to the opening or closing operation.

The valve 5 illustrated is a well known gas valve of commerce, and as it forms no part of my invention it needs no extended description herein, other than to say that the upper member of said valve is provided with a stem or hub 6 upon which the frame 7 of my device is mounted by means of a nut 8, and that the valve stem 9 extends upward through said hub into my device.

My device is all contained within the rectangular frame 7, the two solenoids 10 and 11 being coaxially mounted within a solenoid casing 12, which casing is suspended from the upper member of the frame 7, as shown in Fig. 1. Each solenoid is electrically independent of the other, although provided with a common plunger 13, said plunger being universally connected to a stem 14 by means of a ball and socket arrangement illustrated in detail in Fig. 4.

The stems 9 and 14 are articulately connected by means of pivotally connected links 15 and 16, to the intermediate pivotal point of said links there being connected oppositely disposed transversely extending arms 17, which arms form together a toggle system.

To provide a snap action said arms are fulcrumed upon springs 18 mounted upon the side members of the frame 7, which springs press the ends of the arms 17 towards one another, and thus cause the toggle arms to assume their furthermost points of travel at each end of their path of movement with an accelerated or snap action, which action causes very sudden opening or closing of the valve 5. A slow opening or closing of the valve 5 has been found to result in back firing through the valve 5, so that this snap action imparted to the valve by the toggle arms is an important function of my device.

To reduce friction of the moving parts to a minimum I provide a knife edge mounting of the arms 17 upon their respective springs 18, the ends of the springs resting in V shaped notches in the ends of the arms, as shown in Fig. 1, and illustrated in detail in Fig. 3.

Suitable screws 19 are provided for adjusting the pressure of the springs 18 upon their respective arms 17.

An electrical contact 20 is mounted above one of the arms 17, and another electrical contact 21 is mounted beneath the other of said arms 17, as shown in Fig. 1, said contacts being each insulated from the device by means of insulation members 22 and 23 respectively. Each of the arms 17 is provided with pads 24 with which said contacts coact to complete electrical circuits hereinafter described.

Suitable binding posts 25 and 26 are provided upon the frame 7 and respectively connected with the binding posts 27 and 28 of a thermostat 29 by wires 30 and 31 respectively, the third binding post of the thermostat being grounded by wire 32 as shown in Fig. 1, a battery being inserted between the thermostat and the ground.

The binding post 25 is connected with the winding of the solenoid 10 by wire 33, and the opposite end of said winding is connected to contact 21 by wire 34. The binding post 26 is connected with the winding of the solenoid 11 by wire 35, and the opposite end of said winding is connected to contact 20 by wire 36. The entire device is grounded through the pipe to which the valve 5 is connected.

The operation of my device is as follows:

Let it be supposed that the temperature of the room in which the thermostat is located has raised to a point which causes the blade of the thermostat to contact with the terminal upon binding post 27, thus completing an electrical circuit through the thermostat. The current from the battery now flows through the thermostat, wire 30, binding post 25, wire 33, solenoid winding 10, wire 34, contact 21, and through the members of the device to the ground, and thus back to the battery. This current energizes the solenoid 10 and thereby caused the plunger 13 to rise therein, thus opening the valve 5, the opening being very quick due to the electrical action and also to the snap action of the toggle arms 17 after they have passed their central position, said arms finally assuming the position shown in dotted lines in Fig. 1, and one of said arms then coming into contact with the contact 20. The toggle arms, having passed their central position, will cause the valve 5 to remain open indefinitely, until further action of the device closes the same.

When the temperature of the room in which the thermostat is located rises to a point that causes the blade thereof to contact with the terminal located upon binding post 28 an electrical current is caused to flow from the battery through the wire 32, the thermostat 29, wire 31, binding post 26, wire 35, solenoid winding 11, wire 36, contact 20, and thus through the device to the ground and back to the battery. The solenoid 11 being thus energized causes the plunger to descend therein and to close the valve 5, this closed position of all parts being shown in Fig. 1, and the toggle arms having the same snap action as described with the opening of the valve.

It will be observed that the electric current operates only momentarily, as the instant it is set up at either binding post 27 or 28 of the thermostat it is broken at the corresponding contact 21 or 20 respectively of my device, and it cannot be again established until the temperature conditions within the room containing the thermostat have caused operation of the thermostat. It will also be observed that the operations are alternative, that is when the valve 5 has been opened, the next operation is the closing of the same, and vice versa.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a valve operating device, a pair of adjacently disposed axially mounted solenoids; a plunger common to both of said solenoids; means to connect said plunger to the stem of said valve; toggle arms connected to said means; and yieldable fulcrums for said toggle arms.

2. A valve; a valve stem; a frame mounted upon said valve; toggle arms within said frame coacting with said valve stem; yieldable fulcrum mountings for said toggle arms; means to adjust said fulcrum mountings; solenoids mounted upon said frame; a solenoid plunger coacting with said toggle arms; and electrical make and break contacts coacting with said toggle arms.

In witness whereof I claim the foregoing as my own, I hereunto affix my signature in the presence of two witnesses, at Portland, county of Multnomah, State of Oregon, this 2nd day of September, 1920.

ARTHUR F. ERICKSON.

Witnesses:
C. A. MAGNUSON,
L. J. ROBINSON.